Aug. 23, 1960

J. M. ALGINO ET AL
HYDRAULICALLY ADJUSTABLE
THERMOSTATIC VALVE 2,950,055

Filed Dec. 14, 1956

INVENTORS
JOSEPH M. ALGINO
EDWARD E. MODES

ATTORNEYS

United States Patent Office 2,950,055
Patented Aug. 23, 1960

2,950,055
HYDRAULICALLY ADJUSTABLE THERMOSTATIC VALVE

Joseph M. Algino and Edward E. Modes, Chicago, Ill., assignors to The Dole Valve Company, Chicago, Ill., a corporation of Illinois Filed Dec. 14, 1956, Ser. No. 628,249

4 Claims. (Cl. 236—12)

This invention relates to improvements in thermostatic fluid mixing valves and more particularly relates to such valves in which separate delivery temperatures of the water may be selected for the washing and rinsing operations of automatic washing machines and the like.

A principal object of the invention is to provide an improved form of mixing valve particularly adapted for automatic washing machines and the like, in which the temperature of the water delivered by the valve may be independently preselected for the separate washing and rinsing operations, and in which the temperature of the water for the rinsing operation is attained by fluid pressure means controlled by the cyclic control of the machine.

A still further object of the invention is to provide a thermostatic mixing valve having a central mixing chamber with a thermal element floatingly mounted in the mixing chamber for controlling the tempering of the water therein, in which individual manually adjustable means for the washing and rinsing operations are provided to determine the position of the thermal element in accordance with a selected delivery temperature of the water, and in which fluid pressure operated means are provided to shift the thermal element into an adjusted position in the mixing chamber during rinsing, determined by the position of the manually adjustable means thereof, and to maintain the thermal element in this position to effect the delivery of water at the temperature selected, all under the control of the fluid pressure operated means.

A still further object of the invention is to provide an improved form of mixing valve particularly adapted for washing machines and the like in which the washing temperatures and the rinsing temperatures may be independently preselected under the manual control of the operator of the machine, and in which the selected temperature of the water for the rinsing operation is selected by fluid pressure means operable under the cyclic control of the machine.

These and other objects of the invention will appear from time to time as the following specification proceeds and with reference to the accompanying drawings wherein:

Figure 3 is a fragmentary sectional view somewhat like Fig. 2, but showing the valve set to deliver water at a higher preselected temperature than in Fig. 2 during a rinsing operation.

Figure 1:
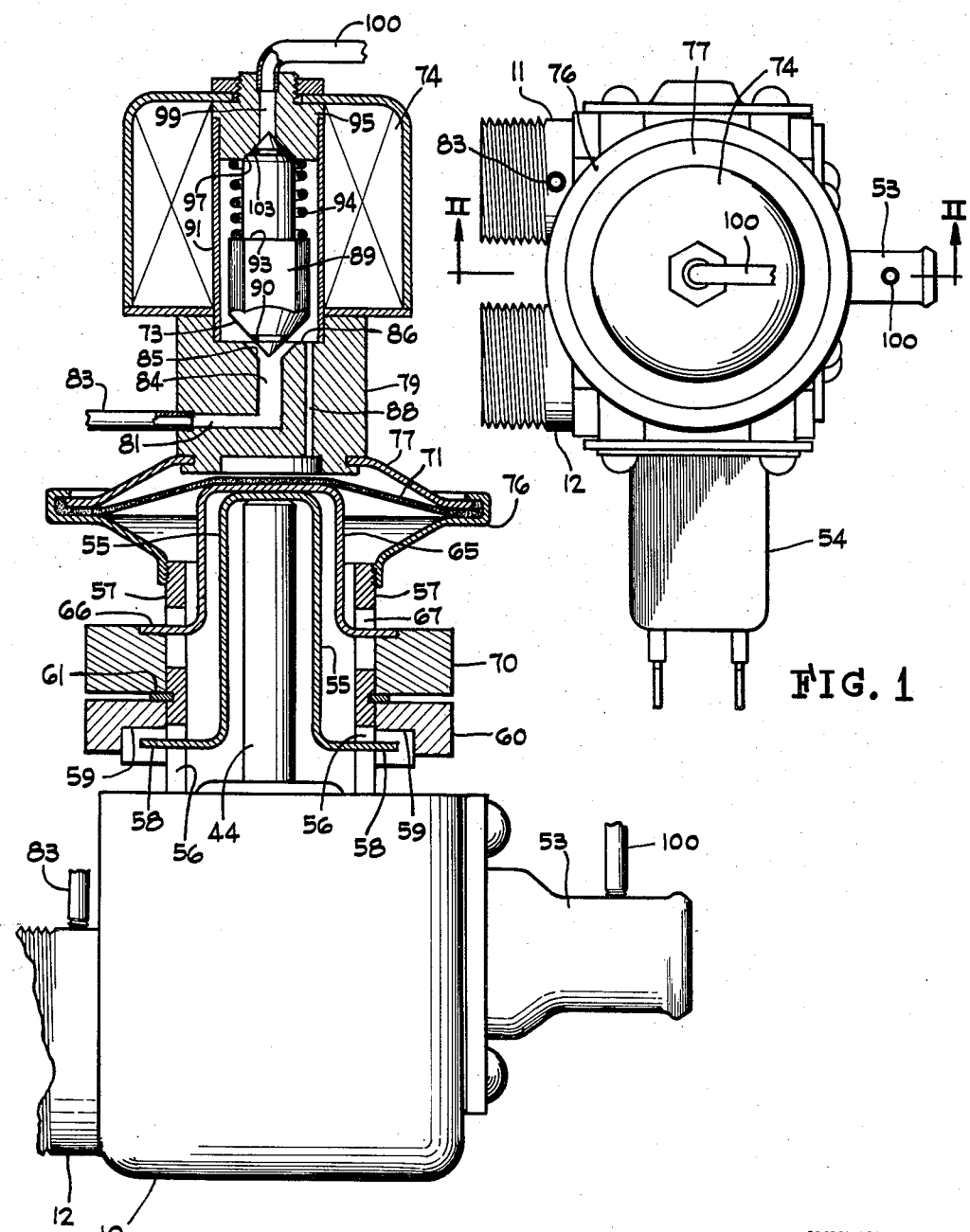
Figure 1 is a top plan view of a mixing valve constructed in accordance with the invention.

In the embodiment of the invention illustrated in the drawings, the valve is shown as comprising a valve body 10 having cold and hot water inlets 11 and 12, respectively, leading into a metering chamber 13 in vertically spaced relation with respect to the wall thereof. An aligned mixing chamber 14 is shown as being in direct communication with one end of the metering chamber 13.

Hot and cold water is metered into the mixing chamber 14 from the metering chamber 13 under the control of a hollow piston valve 16. The piston valve 16 is guided within a generally cylindrical insert 17 extending along the wall of the metering chamber 13 and apertured as indicated by reference character 15, to accommodate the flow of cold water into the metering chamber 13 from the cold water inlet 11 through the apertured portion 15 of the insert 17. The insert 17 is sealed to the wall of the chamber 13 by spaced seals 19 and 20 and is retained in engagement with a shouldered portion 21 extending inwardly from the wall of the metering chamber, by a retainer ring 23, which may be a snap-ring, snapped in the wall of the chamber 13 into engagement with the outer end of the cylindrical insert 17. The insert 17 is provided with an inwardly extending flanged portion 24 extending from the inner end thereof and sealed to the wall of the piston valve 16, as by a sealing member 25. The insert 17 is also provided with a flange 26 extending inwardly therefrom, adjacent the outer end thereof and forming a seat for one end of the piston valve 16. The opposite end of the piston valve 16 is seated against an annular seat 29, shown as being formed integrally with an end wall 30 of the metering chamber 13. A spring 31 seated at one end in the end wall 30 within the annular valve face 29 and at its opposite end on a stirrup 32 for a thermal element 33, is provided to bias the piston valve 16 into engagement with the inner face of the flange 26 and thereby block the flow of cold water into the mixing chamber 14 and accommodate hot water to flow thereinto through a suitable port (not shown). The spring 31 also retracts an extensible power member 35 of the thermal element 33, upon cooling of said thermal element.

The thermal element 33 is shown as being of a so-called power type of thermal element, wherein a fusible thermally expansible material contained within a casing 36 of the thermal element extends the power member or piston 35 from the cylinder 37 of the thermal element as the temperature of water in the mixing chamber approaches the temperature of fusion of the thermally expansible material, as shown and described in Patent No. 2,368,181 which issued to Sergius Vernet on January 30, 1945, and no part of the present invention so not herein shown or described further.

The stirrup 32 against which the power member 35 of the thermal element 33 reacts is maintained in position within the piston valve 16 by an overtravel spring 39 seated at one end on an annular rib 40 extending inwardly from the wall of the piston valve 16 and seated at its opposite end on the stirrup 32, and maintaining said stirrup in engagement with a snap ring 41, engaging an annular rib 43, extending inwardly from the wall of the piston valve 16, adjacent the end face 27 thereof.

The thermal element 33 is guided for slidable movement along the mixing chamber 14 by a shaft or pin 44 extending from a spider 45, encircling the casing 36 of the thermal element and engaging a clamping ring 46 of said thermal element. The pin 44 extends through and is mounted for slidable movement along a sealing plate 47 carried in an end plate 49 of the valve body and sealed thereto. An O-ring 50 recessed within the sealing plate 47 has sealing engagement with the pin 44, and is retained in sealing engagement therewith as by a retainer plate 51. The position of the thermal element 33 in the mixing chamber 14 is adjusted to effect the delivery of water at a preselected temperature through an outlet 53, by the reaction of the pin 44 against a follower 55, guided in slots 56 in a guide member 57, secured to and extending outwardly from the end plate 49. A solenoid 54 controlling operation of a pressure operated diaphragm valve (not shown) as in application Serial No. 611,152 filed by Victor E. Rimsha on September 21, 1956, is provided to control the flow of water from the mixing chamber 14 through the outlet 53.

The follower 55 has oppositely projecting legs 58 extending through the slots 56 and sloped to engage sloping cam faces 59 on the undersurface of a wash cam 60 as in the aforementioned Rimsha application Serial No. 611,152. The wash cam 60 is rotatably mounted on the outer wall of the guide 57 and is retained to said guide as by a snap ring 61 engaging the opposite face of said wash cam from the cam faces 59 thereof.

When the wash cam 60 is in an extreme cold position the legs 58 of the follower 55 will be in engagement with the extreme high part of the cam, adjacent the plate 49. The thermal element 33 will then be positioned to hold the piston valve 16 against the seat 29 in the metering chamber 13 and will be thermostatically inoperative to admit hot water into the mixing chamber 14. Cold water may then be delivered through the outlet 53 of the valve upon energization of the solenoid 54, controlling operation of the shut-off valve (not shown).

Figure 2:
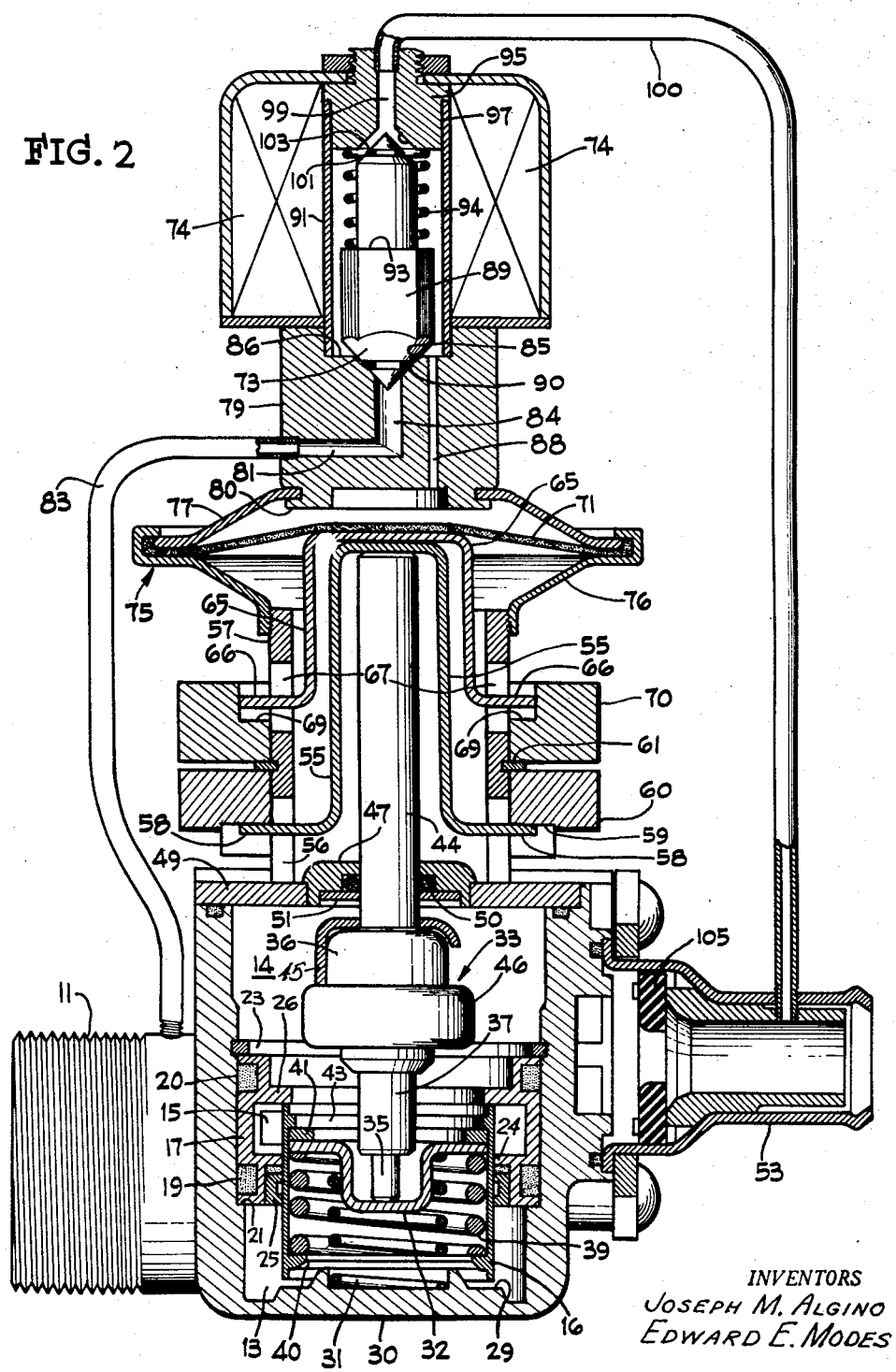
Figure 2 is a vertical sectional view taken through the valve, showing the valve adjusted in a position to deliver water at a preselected temperature for a washing operation.

When the wash cam 60 is turned to the position shown in Figure 2, the thermal element 33 will be in an intermediate position in the mixing chamber 14.

When the cam 60 is in any intermediate position between its extreme hot and cold positions, determined by the extreme inner and outer portions of the sloping cam faces 59, the thermal element 33 will back away from the metering valve 16 under the influence of hot water entering the mixing chamber and will bring the legs 58 of the follower 55 into engagement with the sloping cam faces 59 of the wash cam 60. The thermal element 33 will then be thermostatically effective to engage the metering valve 16 with the seat 29 as the temperature of water in the mixing chamber 14 increases, and to accommodate the spring 31 to engage the annular valve face with the flange 26 as the temperature of the water within the mixing chamber 14 decreases, to obtain tempered water in said mixing chamber for delivery through the outlet 53 at an infinite variety of selected temperatures, determined by the degree of rotation of the wash cam 60 and the positions of the cam faces thereof with respect to the legs 58 of the follower 55.

The position of the thermal element 33 within the mixing chamber 14 and the resultant temperature of the water in said mixing chamber delivered through the outlet 53 for rinsing, is controlled by a rinse cam follower 65 abutting the outer end of the follower 55 and having laterally extending legs 66 extending through and guided for movement along guide slots 67 in the guide 57. The ends of the legs 66 may slope to conform to sloping cam faces 69 of a rinse cam 70. The rinse cam 70 is rotatably carried on the outer wall of the guide 57 and abuts the snap-ring 61 at its undersurface.

The legs 66 of the rinse cam follower 65 are moved into and are maintained in engagement with the sloping cam faces 69 of the rinse cam 70 by a diaphragm 71 extended by fluid under pressure supplied under the control of a solenoid controlled valve 73. The valve 73 is operated upon the energization of a magnet coil 74 of the solenoid, to supply fluid under pressure to said diaphragm, to bring said diaphragm into engagement with the outer end portion of the follower 65 and to shift said follower into engagement with the cam faces 69, and thereby shift the thermal element 33 into the proper position in the mixing chamber 13 to deliver water at the temperature selected by the rinse cam 60.

The diaphragm 71 is sealed at its periphery to a casing 75, having a lower casing part 76, shown as being threaded on the guide 57 and projecting upwardly therefrom. The marginal edge portion of the diaphragm 71 is maintained in sealing engagement with an upper casing portion 77 of the casing 75 by the spinning or crimping the marginal edge of the lower casing 76 around the marginal edge of the diaphragm 71 into engagement with the marginal edge of the upper casing portion 77. The upper casing portion 77 in turn forms a support for a block 79 for the valve 73 and is sealed thereto, as by spinning or crimping a depending annular wall portion 80 of said valve block thereto.

The valve block 79 is shown as having a passageway 81 leading thereinto from one side thereof and connected with the cold water inlet 11 through a passageway or tube 83. The passageway 81 leads to an axial passageway 84 terminating into a frusto-conical seat 85, opening to a valve chamber 86. An axially extending passageway 88 leads from the chamber 86 to supply fluid under pressure to engage the diaphragm 71 with the end of the follower 65 and move said follower into engagement with the cam faces 69 of the rinse cam 70, to shift the thermal element 33 into position to control the temperature of the water for a rinsing operation.

The valve 73 is shown as being conical and as being formed integrally with an armature 89. An O-ring 90 is recessed within the conical valve face of the valve 73 to seal said valve to the seat 85. The armature 89 extends upwardly within a tube 91, made from a non-magnetic material. An upwardly facing shoulder 93 on the armature 89 forms a seat for a compression spring 94 biasing the valve 73 into a closed position. The spring 94 is seated at its end opposite the shoulder 93 on the inner end of a seating member 95 which may be pressed within the guide tube 91, and soldered thereto.

The seating member 95 is provided with a frusto-conical valve seat 97 therein, in axial alignment with the valve seat 85 and terminating into a passageway 99, connected with the outlet 53 from the valve through a return line 100. The seat 97 is engaged by a conical valve 101, on the opposite end of the armature 89 from the conical valve 73, as the valve 73 opens, upon energization of the electromagnet 74. An O-ring 103 is recessed within the valve 101 to maintain a tight seal against the leakage of fluid to the return line 100, when the valve 101 is in its closed position.

Upon energization of the electromagnet 74, the valve 73 will open and the valve 101 will close. This will admit fluid under pressure from the cold water inlet 11 through the tube 83 to the valve chamber 86 and through the passageway 88 to the diaphragm chamber to exert pressure on the diaphragm 71. The diaphragm 71 will then be moved by fluid under pressure to engage the legs 66 of the follower 65 with the sloping cam faces 69, and to disengage the legs 58 of the follower 55 from the sloping cam faces of the cam 60, where the rinse temperature is different from the wash temperature. The continued application of fluid under pressure on the diaphragm 71 will then hold the thermal element in position to effect the delivery of water through the outlet 53 at the temperature selected by the position of the rinse cam 70.

The solenoid 74 may be energized under the control of a cyclic timer (not shown) of a washing machine and the like energizing said solenoid during the rinsing operation.

A uniform rate of flow control device, herein shown as being in the form of a resilient annulus 105, may be provided in the outlet 53 for maintaining a substantially uniform rate of flow through the outlet regardless of variations in inlet pressures, as shown in the aforementioned Rimsha application Serial No. 611,152 and no part of the present invention so not herein shown or described further.

In operation of the valve, the temperature of the wash water may be selected by turning the wash cam 60 to the proper temperature position, to give a selected controlled temperature during the washing operation. The rinse cam 70 may also be turned to the desired temperature position to preselect the temperature of the rinse water, which temperature may be the same as or lower than the wash temperature. During the washing operation the thermal element 33 will back up with respect to the valve 16 as it is heated, and will seek its position in the mixing chamber 14 in accordance with the selected temperature of the water to be delivered through the outlet 53, determined by the setting of the wash cam 60 and engagement of the legs 58 of the follower 55 with the cam faces thereof.

Assuming that the rinse cam 70 has been set for a preselected delivery temperature of the water lower than the temperature of the water selected by the wash cam 60 for washing, during the rinsing operation the cyclic timer of the washing machine will energize the solenoid 74 to open the valve 73 and effect the supply of fluid under pressure to the diaphragm 71 to act against the end of the rinse cam follower 65 and shift said follower into engagement with the cam faces 69 of the rinse cam 70 and also shift the cam follower 55 out of engagement with the cam faces 59 of the follower 60. This will then shift the thermal element 33 along the chamber 14 into the proper position to effect the delivery of water at the temperature setting of the rinse cam. At the termination of the rinsing operation the magnet coil 74 is deenergized, preferably by operation of the cyclic timer for controlling operation of the washing machine, where the valve supplies water to a washing machine. This will effect the closing of the valve 73 and the opening of the return valve 101, to accommodate fluid in the diaphragm chamber to be returned through the return line 100 to relieve pressure from the diaphragm 71.

Assuming that the position of the wash cam is the same as for the previous washing operation, during the next washing operation heating of the thermal element 33 and extensible movement of the power member 35 thereof will engage the wash cam 55 with the cam faces 59 of the wash cam 60 and disengage the rinse cam follower 65 from the cam faces 69 of the rinse cam 70, to again effect the delivery of tempered water through the outlet 53 at the temperature setting of the wash cam.

While we have herein shown and described one form in which our invention may be embodied, it will be understood that various modifications and variations thereof may be effected without departing from the spirit and scope of the novel concepts thereof.

We claim as our invention:

1. In a thermostatic mixing valve including a valve body having hot and cold fluid inlets leading thereinto and an outlet leading therefrom, a mixing chamber within said valve body communicable with said inlets and said outlet, a reciprocably movable metering valve in said mixing chamber for metering the flow of hot and cold fluid thereinto, a thermal sensitive element disposed within said mixing chamber and operably connected with said metering valve for controlling reciprocable movement thereof, the improvement of means for selectively positioning said thermal sensitive element within said mixing chamber comprising a shaft engageable with said thermal sensitive element and slidable within said valve body, spring means biasing said thermal sensitive element and said shaft in one direction, a follower engageable with said shaft to move said shaft and said thermal sensitive element in an opposite direction against the opposing biasing force of said spring means, a manually movable cam engageable with said follower to operably move said follower and said shaft and said thermal sensitive element against the biasing force of said spring means, a second follower engageable on one side thereof with said first follower, a resilient diaphragm engageable with said second follower on the opposite side thereof, means for directing pressurized fluid to said resilient diaphragm to operably move said followers and said shaft and said thermal sensitive element against the biasing force of said spring means, and a second manually adjustable cam operable to limit movement of said second follower against the biasing force of said spring means.

2. In a thermostatic mixing valve including a valve body having hot and cold fluid inlets leading thereinto and an outlet leading therefrom, a mixing chamber within said valve body communicable with said inlets and said outlet, a reciprocably movable metering valve in said mixing chamber for metering the flow of hot and cold fluid thereinto, a thermal sensitive element disposed within said mixing chamber and operably connected with said metering valve for controlling reciprocable movement thereof, the improvement of means for selectively positioning said thermal sensitive element within said mixing chamber comprising a shaft engageable with said thermal sensitive element and slidable within said valve body, spring means biasing said thermal sensitive element and said shaft in one direction, a follower engageable with said shaft to move said shaft and said thermal sensitive element against the opposing biasing force of said spring means, a manually movable cam engageable with said follower to operably move said follower and said shaft and said thermal sensitive element against the biasing force of said spring means, a second follower engageable with said first follower, a second manually movable cam effective to selectively limit the amount of movement of said second follower against the biasing force of said spring means, a resilient diaphragm engageable with said second follower, means for directing pressurized fluid from one of said inlets to one side of said resilient diaphragm, to urge movement of said followers and said shaft and said thermal sensitive element against the opposing biasing force of said spring means, exhaust means for exhausting pressurized fluid from said one side of said diaphragm, and electrically energizable valve means for controlling the flow of fluid to and from said one side of said diaphragm.

3. In a thermostatic mixing valve including a valve body having hot and cold fluid inlets leading thereinto and an outlet leading therefrom, a mixing chamber within said valve body communicable with said inlets and said outlet, a reciprocably movable metering valve in said mixing chamber for metering the flow of hot and cold fluid thereinto, a thermal sensitive element disposed within said mixing chamber and operably connected with said metering valve for controlling reciprocable movement thereof, the improvement of means for selectively positioning said thermal sensitive element within said mixing chamber comprising a shaft engageable with said thermal sensitive element and slidable within said valve body, spring means biasing said thermal sensitive element and said shaft in one direction, a follower engageable with said shaft to move said shaft and said thermal sensitive element in an opposite direction against the opposing biasing force of said spring means, a manually movable cam engageable with said follower to operably move said follower and said shaft and said thermal sensitive element against the biasing force of said spring means, a second follower engageable on one side thereof with said first follower, second means for moving said shaft and said thermal sensitive element against the opposing biasing force of said spring means comprising a diaphragm chamber formed within said valve body, a diaphragm within said chamber engageable with said second follower, a passageway communicating pressurized fluid from one of said inlets to said chamber to move said diaphragm to effect movement of said thermal sensitive element against the opposing biasing force of said spring means, a second passageway communicating fluid from said chamber to said outlet, electrically energizable valve means controlling fluid flow through said inlet and said outlet, and a second manually adjustable cam operable to limit movement of said second follower against the biasing force of said spring means.

4. In a thermostatic mixing valve including a valve body having hot and cold fluid inlets leading thereinto and an outlet leading therefrom, a mixing chamber within said valve body communicable with said inlets and said outlet, a reciprocably movable metering valve in said mixing chamber for metering the flow of hot and cold fluid thereinto, a thermal sensitive element disposed within said mixing chamber and operably connected with said metering valve for controlling reciprocable movement thereof, the improvement of means for selectively positioning said thermal sensitive element within said mixing chamber comprising a shaft engageable with said thermal sensitive element and slidable within said valve body, spring means biasing said thermal sensitive element and said shaft in one direction, a follower engageable with said shaft to move said shaft and said thermal sensitive element in an opposite direction against the opposing biasing force of said spring means, a manually movable cam engageable with said follower to operably move said follower and said shaft and said thermal sensitive element against the biasing force of said spring means, a second follower engageable on one side thereof with said first follower, fluid pressure operated means operatively connected with said second follower on the opposite side thereof, means for directing pressurized fluid to said fluid pressure operated means to operably move said followers and said shaft and said thermal sensitive element against the biasing force of said spring means, and a second manually adjustable cam operable to limit movement of said second follower against the biasing force of said spring means.

References Cited in the file of this patent

UNITED STATES PATENTS

| | | |
|---|---|---|
| 1,244,184 | Dunwoodie | Oct. 23, 1917 |
| 2,442,886 | Bowen | June 8, 1948 |
| 2,444,631 | Chace | July 6, 1948 |
| 2,489,896 | Kempton | Nov. 29, 1949 |
| 2,548,516 | Cantalupo | Apr. 10, 1951 |
| 2,607,207 | Branson | Aug. 19, 1952 |
| 2,657,859 | Wangenheim | Nov. 3, 1953 |